United States Patent Office 3,179,021
Patented Apr. 20, 1965

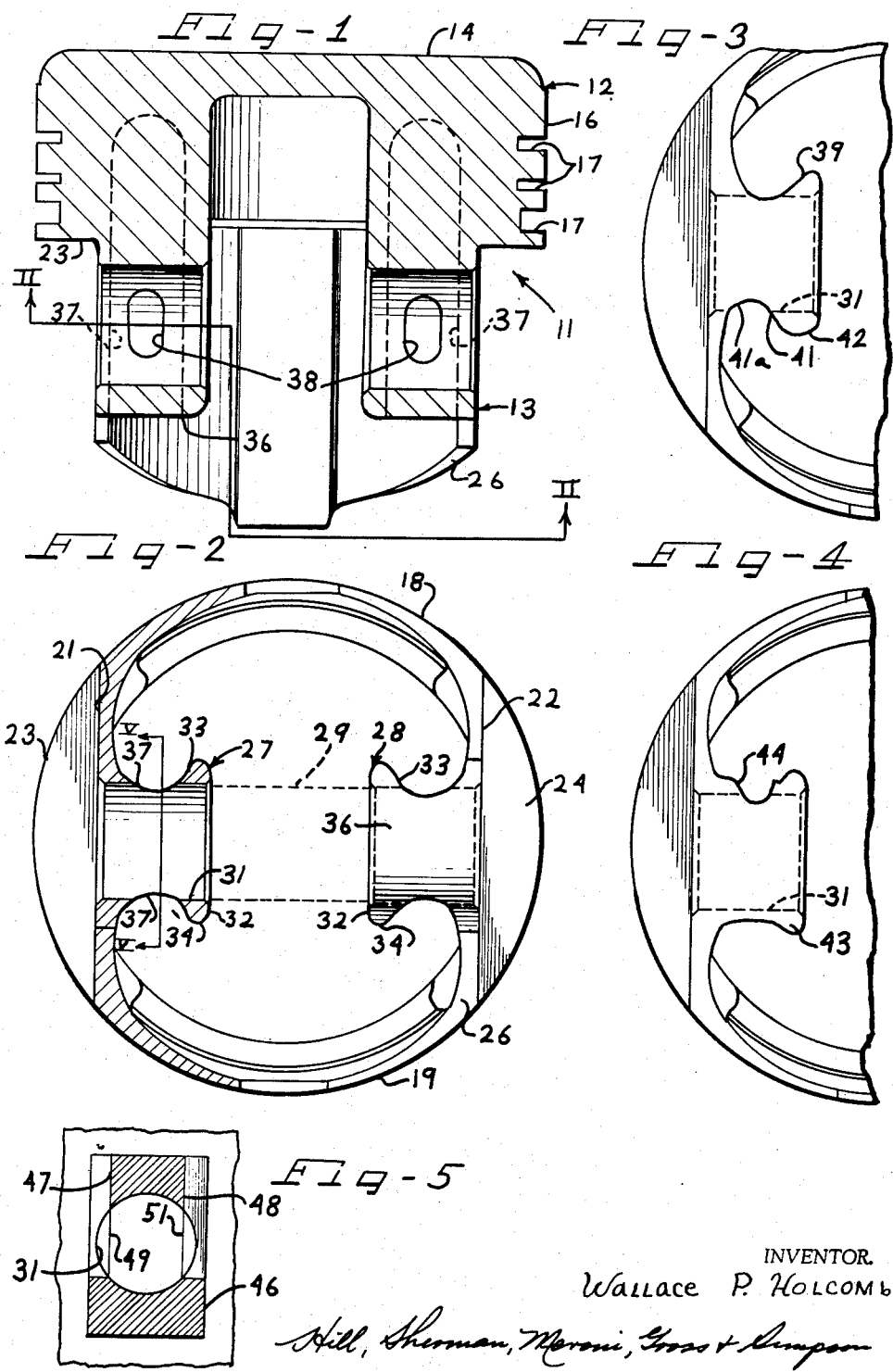

3,179,021
PISTON
Wallace Philip Holcombe, Orange Village, Ohio, assignor to Thompson Ramo Wooldridge Inc., Cleveland, Ohio, a corporation of Ohio
Filed July 26, 1963, Ser. No. 297,870
8 Claims. (Cl. 92—158)

This invention generally relates to combustion engine pistons and more particularly relates to a combustion engine piston having an improved wrist pin boss.

Present internal combustion engine pistons are equipped with wrist pin bosses that have a solid construction with a bore formed therein to give the wrist pin effective support. In order to effectively lubricate the wrist pin in this type of pin boss bearing bore. it was necessary to provide lubricating passages in the wrist pin, the piston rod and the piston. Such arrangements reduced the strength and added cost to the assembly without obtaining any weight advantage. The present invention eliminates the problems of wrist pin lubrication and provides an improved piston wrist pin boss which allows lubrication of the wrist pin in a simple and effective manner. Also, the wrist pin boss is constructed to reduce the overall weight of the piston while maintaining effective support for the wrist pin.

Therefore, it is an object of the present invention to provide a combustion engine piston having an improved wrist pin boss.

It is another object of the present invention to provide a wrist pin boss for an internal combustion engine piston having a lubrication passage leading to the wrist pin bearing bore.

It is another object of the present invention to provide a piston wrist pin boss having relatively uncomplicated means to lubricate the wrist pin.

It is further another object of the present invention to provide a piston wrist pin boss having a wrist pin bearing bore formed therethrough and a lubricating passageway formed therein to communicate with the wrist pin bore that maintains effective support for a wrist pin.

It is still another object of the present invention to provide a piston having a pair of wrist pin bosses being diametrically opposite one another with each boss having a wrist pin bearing bore being concentric with each other and having the bore axial center extending perpendicular to the axial center of the piston and each wrist pin boss having at least one groove formed in the side thereof and extending substantially parallel to the piston axial center and intersecting the wrist pin bore to provide a lubricating passageway or opening therefor.

These and other features, objects, and advantages of the present invention will become more apparent after a careful consideration of the following description of the present invention in conjunction with the accompanying drawings wherein like reference numerals and characters refer to like and corresponding parts throughout the several views.

On the drawings:

FIGURE 1 is a longitudinal cross-sectional view with parts in elevation of a piston constructed in accordance to the principles of the present invention;

FIGURE 2 is a partial transverse cross-sectional and partial bottom view of the piston of the present invention taken along lines II—II of FIGURE 1;

FIGURE 3 is a partial bottom view of another piston constructed in accordance to the principles of the present invention;

FIGURE 4 is a partial bottom view of another piston constructed in accordance to the principles of the present invention; and FIGURE 5 is a partial longitudinal cross-sectional view of still another embodiment of a piston of the present invention when said cross section is taken along lines V—V of a view which would be similar to that of FIGURE 2.

As shown on the drawings:

Briefly stated, the present invention is concerned with improved wrist pin bosses for an internal combustion engine piston. Pistons of this type presently have wrist pin bosses extending substantially the entire length of the piston and extending radially inwardly for a predetermined distance to provide effective support for a wrist pin. There are usually two diametrically opposed wrist pin bosses facing each other with a wrist pin bearing bore in each wrist pin boss. The wrist pin bearing bores are concentric with each other and have an axial center perpendicular to the axial center of the piston. The wrist pin bosses have a bottom face facing the bottom of the piston and a front face facing radially inwardly toward the other wrist pin boss. At least one lubricating passageway is formed in each wrist pin boss by a groove in the side wall thereof. The lubricating groove extends from the bottom face of the wrist pin boss along the side wall and the bottom wall of the groove intersects the side of the wrist pin bore to form the lubricating passageway. The groove extends substantially parallel to the axial center line of the piston and has a predetermined depth so that the groove bottom wall intersects the side of the bore to form a sufficiently large lubricating passageway or opening that leads into the wrist pin bore. This axially extending lubricating groove does not require the thickness of the wrist pin bosses to be shortened and maintains the longitudinal strength of the pin bosses and also reduces the overall weight of the piston.

Referring to FIGURES 1 and 2, there is illustrated a piston 11 manufactured in accordance to the principles of the present invention. The piston 11 has a head portion 12 and a skirt portion 13. The head portion has a circular top wall 14 and a cylindrical side wall 16 provided with a plurality of piston ring grooves 17.

The skirt portion 13 extends from the bottom of the head portion 12 and is frusto-cylindrical with curved walls 18 and 19 having an outer radius of curvature equal to the outer radius of curvature of the cylindrical head wall 16, and two parallel flat outer surface walls 21 and 22 spaced less than the outer diameter of the head wall 16 and respectively forming shoulders 23 and 24 therewith. The frusto-cylindrical skirt extends from the head portion to an open-end bottom wall 26.

The piston head and skirt are hollow with the head having a wall thickness greater than the skirt. Protruding a predetermined distance radially inwardly into the interior of the piston are diametrically opposed wrist pin bosses 27 and 28. The wrist pin bosses 27 and 28 are preferably integral with the piston and substantially longitudinally extend the length of the piston—from a point spaced inwardly from the end wall 26 along the inner surface of the flat walls 21 and 22 to the inner surface of the top wall 14. The longitudinal length of the wrist pin bosses is predetermined to give longitudinal strength to the piston to withstand the longitudinal forces exerted on the piston by the up and down movement of the piston connecting rod (not shown) connected to the wrist pin, shown by dotted line 29.

A bore is drilled through the piston skirt portion and through both wrist pin bosses to form a wrist pin bearing bore 31 in each wrist pin boss. The wrist pin bores are concentric with each other and their axial center line is perpendicular to the axial center line of the piston. The length of the bores are predetermined by the thickness or length of the wrist pin bosses that extend radially towards each other to provide effective support for the wrist pin 29 and thereby prevent distortion of the wrist pin by the up and down movement of the piston connecting rod.

Each wrist pin boss has a front face 32, two side walls 33 and 34, and a bottom face 36. Each side wall has a concave groove 37 extending from the bottom face 36 substantially the entire width of the wrist pin boss. The two grooves in each wrist pin boss are diametrically opposite each other and are spaced radially outwardly from the front faces 32 of the wrist pin bosses and are of a sufficient depth to intersect the wrist pin bores 31 to form lubricating passageways 38 therewith that communicate with the interior of the wrist pin bores 31. The passageways 38 in each wrist pin boss are concentric and diametrically opposed to each other.

The grooves 37, extending in a longitudinal direction parallel to the axis of the piston, eliminate a substantial amount of weight from the piston and still maintain the longitudinal strength in the piston. Further, by having the grooves radially outwardly spaced from the front face of the pin bosses the effective support given to wrist pins, by long wrist pin bores, is maintained.

Referring to FIGURE 3, there is illustrated another embodiment of the present invention. This embodiment utilizes a pair of lubricating grooves 39 and 41, on a wrist pin boss 42, that extend parallel to the axial center of the piston and intersect the wrist pin bore 31. However, the groove 41 has a straight bottom wall 41a while the groove 39 has a concave configuration. Also, the grooves 39 and 41 are not diametrically opposite each other but have radial center lines that are spaced from each other.

Referring to FIGURE 4, there is illustrated another embodiment of the present invention. There is shown an effective means for lubricating the wrist pin of a piston by having a wrist pin boss 43 with a single concave groove 44 extending longitudinally along the side wall of the boss parallel to the axial center line of the piston and intersecting the wrist pin bore 31 to provide an effective lubricating means for the wrist pin.

Referring to FIGURE 5 there is illustrated still another embodiment of the present invention. There is shown a wrist pin boss 46, similar to the wrist pin boss 27 of FIGURE 2, and a pair of diametrically opposed lubricating grooves 47 and 48, similar to the grooves 37. However, the grooves 47 and 48 do not extend the entire width of the wrist pin boss but only extend parallel to the piston axial center-line for a distance sufficient to form lubricating passageways 49 and 51. The grooves 47 and 48 intersect the wrist pin bore 31 to form chords therewith. However, it is not necessary to intersect the bore to form a chord therewith. The groove need only intersect the bore to provide a passageway that is sufficiently large to supply the desired amount of lubricating oil to the wrist pin.

It is of course understood that pistons of the present invention may have wrist pin bosses with combinations of the above lubricating grooves i.e. one wrist pin boss having one lubricating groove and the other wrist pin boss having two lubricating grooves.

Therefore, my invention provides an effective means for supplying lubricant to the piston pin journals of forged, die cast, or permanent mold cast pistons where the piston pin is retained by a press fit in the connecting rod or where a full floating pin is used, in which case lock ring grooves would normally be provided at the outer ends of the piston pin bores.

Although various modifications might be suggested by those versed in the art, it should be understood that I wish to embody within the scope of the patent warranted hereon, all such embodiments as reasonably and properly come within the scope of my contribution to the art.

I claim as my invention:

1. An internal combustion engine piston having a head portion, a skirt portion, a pair of wrist pin bosses, and a wrist pin bearing bore formed in each wrist pin boss comprising:
    at least one groove formed in each wrist pin boss,
    said groove having a sufficient depth to intersect the wrist pin bore to form a lubricating passageway communicating with the wrist pin bore, and
    said groove being formed in the side walls of each wrist pin boss spaced from the front face thereof,
    said groove extending substantially the entire width of the wrist pin boss,
whereby the piston is provided with effective means for supplying a lubricant to the wrist pin bearing bore.

2. An internal combustion engine piston having a head portion, a skirt portion, a pair of wrist pin bosses, and a wrist pin bearing bore formed in each wrist pin boss comprising:
    at least one groove formed in each wrist pin boss,
    said groove having a sufficient depth to intersect the wrist pin bore to form a lubricating passageway communicating with the wrist pin bore,
    said groove being formed in the side walls of each wrist pin boss spaced from the front face thereof,
    said groove extending substantially the entire width of the wrist pin boss, and
    said groove extending parallel to the axial centerline of the piston
whereby the piston is provided with effective means for supplying a lubricant to the wrist pin bearing bore, maintaining the longitudinal strength of the piston, and provide effective support for a wrist pin.

3. A hollow internal combustion engine piston having a head portion, a skirt portion, a pair of diametrically opposite wrist pin bosses extending substantially the entire length of the piston interior from the skirt portion to the head portion, and a wrist pin bearing bore formed in each wrist pin boss and being concentric with each other and having their axial center line extending perpendicular to the axial center line of the piston, comprising:
    at least one groove formed in each wrist pin boss,
    said groove having a sufficient depth to intersect the wrist pin bore to form a lubricating passageway communicating with the wrist pin bore,
    said groove being formed in the side walls of each wrist pin boss spaced from the front face thereof,
    said groove extending substantially the entire width of the wrist pin boss, and
    said groove extending parallel to the axial center line of the piston
whereby the piston is provided with effective means for supplying a lubricant to the wrist pin bearing bore, maintaining the longitudinal strength of the piston, and provide effective support for a wrist pin.

4. An internal combustion engine piston having a head portion, a frusto cylindrical skirt portion, a pair of diametrically opposite wrist pin bosses extending substantially the entire length of the piston interior from the skirt portion to the head portion, and a wrist pin bearing bore formed in each wrist pin boss and being concentric with each other and having their axial center line extending perpendicular to the axial center line of the piston, comprising:
    at least one groove formed in each wrist pin boss,
    said groove having a sufficient depth to intersect the wrist pin bore to form a lubricating passageway communicating with the wrist pin bore,
    said groove being formed in the side walls of each wrist pin boss spaced from the front face thereof,
    said groove extending substantially the entire width of the wrist pin boss, and
    said groove extending parallel to the axial center line of the piston
whereby the piston is provided with effective means for supplying a lubricant to the wrist pin bearing bore, maintaining the longitudinal strength of the piston, and provide effective support for a wrist pin.

5. An internal combustion engine piston having a head portion, a frusto cylindrical skirt portion, a pair of diametrically opposite wrist pin bosses extending substantially the entire length of the piston interior from the skirt portion to the head portion, and a wrist pin bearing bore formed in each wrist pin boss and being concentric with each other and having their axial center line extending perpendicular to the axial center line of the piston, comprising:
- a pair of diametrically opposite grooves formed in each wrist pin boss,
- said grooves having a sufficient depth and length to intersect the wrist pin bore to form a pair of respective lubricating passageways communicating with the wrist pin bore,
- one of said grooves being formed in each side wall of each wrist pin boss spaced from the front face thereof, and
- said grooves extending parallel to the axial center line of the piston whereby the piston is provided with effective means for supplying a lubricant to the wrist pin bearing bore, maintaining the longitudinal strength of the piston, and provide effective support for a wrist pin.

6. A hollow internal combustion engine piston having a head portion, a skirt portion, a pair of diametrically opposite wrist pin bosses extending substantially the entire length of the piston interior from the skirt portion to the head portion, and a wrist pin bearing bore formed in each wrist pin boss and being concentric with each other and having their axial center line extending perpendicular to the axial center line of the piston, comprising:
- a pair of grooves formed in each wrist pin boss,
- said grooves having a sufficient depth and length to intersect the wrist pin bore to form a pair of respective lubricating passageways communicating with the wrist pin bore,
- one groove being formed in each side wall of each wrist pin boss spaced from the front face thereof, and
- said grooves extending parallel to the axial center line of the piston whereby the piston is provided with effective means for supplying a lubricant to the wrist pin bearing bore, maintaining the longitudinal strength of the piston, and provide effective support for a wrist pin.

7. An internal combustion engine piston having a head portion, a skirt portion, a pair of diametrically opposite wrist pin bosses, and a wrist pin bearing bore formed in each wrist pin boss comprising:
- a pair of grooves formed in each wrist pin boss,
- said grooves having sufficient depth and length to intersect the wrist pin bore to form a pair of respective lubricating passageways communicating with the wrist pin bore,
- said grooves being formed in the side walls of each wrist pin boss spaced from the front face thereof, and said groove extending parallel to the axial center line of the piston whereby the piston is provided with effective means for supplying a lubricant to the wrist pin bearing bore.

8. An internal combustion engine piston having a head portion, a skirt portion, a pair of wrist pin bosses, and a wrist pin bearing bore formed in each wrist pin boss comprising:
- at least one groove formed in each wrist pin boss,
- said groove having a sufficient depth and length to intersect the wrist pin bore to form a lubricating passageway communicating with the wrist pin bore,
- said groove being formed in the side wall of each wrist pin boss spaced from the front face thereof, and
- said groove extending parallel to the axial center line of the piston whereby the piston is provided with effective means for supplying a lubricant to the wrist pin bearing bore.

References Cited by the Examiner

UNITED STATES PATENTS 1,511,135  10/24  Moser _____ 92—158

RICHARD B. WILKINSON, *Primary Examiner.*

KARL J. ALBRECHT, *Examiner.*